United States Patent [19]
Olarig et al.

[11] Patent Number: 5,841,795
[45] Date of Patent: Nov. 24, 1998

[54] ERROR CORRECTION CODES

[75] Inventors: Sompong Paul Olarig, Cypress; William L. Walker, Houston, both of Tex.

[73] Assignee: Compaq Computer Corporation, Houston, Tex.

[21] Appl. No.: 599,757

[22] Filed: Feb. 12, 1996

[51] Int. Cl.$^6$ ............................. G11C 29/00; G06F 11/10
[52] U.S. Cl. .................................. 371/40.13; 371/40.12; 371/40.18; 371/51.1
[58] Field of Search .............................. 371/40.1, 40.11, 371/40.12, 40.13, 40.18, 51.1, 40.17

[56] References Cited

U.S. PATENT DOCUMENTS

| 3,868,632 | 2/1975 | Hong et al. | 371/37.4 |
|---|---|---|---|
| 4,099,160 | 7/1978 | Flagg | 371/37.12 |
| 4,995,041 | 2/1991 | Hetherington et al. | 371/40.1 |
| 5,107,503 | 4/1992 | Riggle et al. | 371/37.11 |
| 5,226,043 | 7/1993 | Pughe, Jr. et al. | 371/40.1 |
| 5,321,706 | 6/1994 | Holm et al. | 371/51.1 |
| 5,331,645 | 7/1994 | Miller et al. | 371/37.1 |
| 5,331,646 | 7/1994 | Kreuger et al. | 371/40.1 |
| 5,404,361 | 4/1995 | Casorso et al. | 371/40.12 |
| 5,452,261 | 9/1995 | Chung et al. | 365/233 |
| 5,481,552 | 1/1996 | Aldereguia et al. | 371/40.1 |
| 5,490,155 | 2/1996 | Abdoo et al. | 371/40.1 |
| 5,537,425 | 7/1996 | Tsou | 371/51.1 |
| 5,577,004 | 11/1996 | Leshem | 365/230.03 |
| 5,691,996 | 11/1997 | Chen et al. | 371/51.1 |

OTHER PUBLICATIONS

No Author, "Error Correction Codes with Address Checking", IBM Technical Disclosure Bulletin, vol. 32, No. 1, Jun. 1989, pp. 375–377.

Lin et al., "Error Control Coding, Fundamentals and Applications", Chapter 3, Prentice–Hall, (1982).

Hove et al., "Error Correction and Concealment in the Compact Disc System", Philips Technical Review, vol. 40 (1980), No. 6, pp. 166–172.

Hsiao, "A Class of Optimal Minimal Odd Weight Column SEC–DED Codes", IBM J. Res. Develop., pp. 395–400.

Fung, "A Survey of the Theory of Error–Correcting Codes" (Undated—located in Internet).

Bossen, "b–Adjacent Error Correction", IBM J. Res. Develop., pp. 402–408 (Jul. 1970).

Kaneda, S., "A Class of Odd–Weight–Column SEC–D-ED–SbED Codes for Memory System Applications", IEEE Trans. on Computers, vol. C–33, No. 8, Aug. 1984, pp. 737–739.

Rao, T. et al., Error–Control Coding for Computer Systems, Prentice–Hall, 1989, pp. 261–293, Dec. 1989.

Primary Examiner—Stephen M. Baker
Attorney, Agent, or Firm—Fish & Richardson, P.C.

[57] ABSTRACT

A method of detecting and correcting errors in a memory subsystem of a computer is described. The method includes beginning a write operation of N data bits to a memory, generating M check bits from the N data bits, writing the N data bits and the M check bits to the memory, reading the N data bits and M check bits from the memory, generating X syndrome bits from the N data bits and the M check bits, and using the X syndrome bits to detect and correct errors. Preferably, the M check bits are generated also from A address bits corresponding to the location in memory to which the N data bits and M check bits are to be written.

29 Claims, 8 Drawing Sheets

| 0123 4567 | 11 1111<br>8901 2345 | 1111 1111<br>6789 0123 | 2222 2222<br>4567 8901 | 2233 3333<br>8901 2345 | 3333 4444<br>6789 0123 | 4444 4444<br>2345 6789 | 4455 5555<br>8901 2345 | 5555 55cc<br>6707 8916 | CHECK<br>66cc 66cc<br>0125 2334 |
|---|---|---|---|---|---|---|---|---|---|
| 1111 0000 | 1000 1100 | 1111 0000 | 1111 1000 | 0100 1000 | 1000 1000 | 0000 1000 | 1010 1000 | 1000 1100 |
| 1111 0000 | 0100 1000 | 0000 1111 | 0000 0100 | 1100 0100 | 0100 0100 | 1111 0100 | 1100 1010 | 1000 1000 |
| 0000 1111 | 0010 1100 | 1111 0000 | 0000 0010 | 1000 0010 | 0010 0010 | 0100 0010 | 1000 1100 | 1010 1000 |
| 0000 1111 | 0001 0100 | 0000 1111 | 1111 0001 | 1100 0001 | 0001 0001 | 0010 0001 | 1000 1000 | 1100 1010 |
| 1000 1000 | 0000 0011 | 1000 1000 | 1000 1000 | 0000 1111 | 1111 1111 | 0001 0000 | 1100 0100 | 1100 0101 |
| 0100 0100 | 1111 0010 | 0100 0100 | 0100 0100 | 1111 0000 | 0000 0000 | 0100 0000 | 0100 0100 | 0100 0101 |
| 0010 0010 | 1111 0001 | 0010 0010 | 0010 0010 | 0000 1111 | 0010 1111 | 0010 1111 | 0101 0010 | 1101 1100 |
| 0001 0001 | 0000 0001 | 0001 0001 | 0001 0001 | 1111 0000 | 0001 1111 | 0001 1111 | 0001 1100 | 0100 0100 |

DATA BITS ← | → CHECK BITS

FIG. 7

| 0123 4567 | 11 1111<br>8901 2345 | 1111 1111<br>6789 0123 | 2222 2222<br>4567 8901 | 2233 3333<br>8901 2345 | 3333 4444<br>6789 0123 | 4444 4444<br>2345 6789 | 4455 5555<br>8901 2345 | 5555 6666<br>6789 0123 | CHECK<br>cccc cccc<br>0123 4567 |
|---|---|---|---|---|---|---|---|---|---|
| 1111 0000 | 1000 1100 | 1111 0000 | 1111 1000 | 0100 1000 | 1000 1000 | 0000 1000 | 1111 1000 | 1000 0000 |
| 1111 0000 | 0100 1000 | 0000 1111 | 0000 0100 | 1100 0100 | 0100 0100 | 1111 0100 | 1111 0100 | 0100 0000 |
| 0000 1111 | 0010 1100 | 1111 0000 | 0000 0010 | 1000 0010 | 0010 0010 | 0000 0010 | 1111 0010 | 0010 0000 |
| 0000 1111 | 0001 0100 | 0000 1111 | 1111 0001 | 1100 0001 | 0001 0001 | 0000 0001 | 1111 0001 | 0001 0000 |
| 1000 1000 | 0000 0011 | 1000 1000 | 1000 1000 | 0000 1111 | 1111 1111 | 1000 0000 | 1000 1000 | 0000 1000 |
| 0100 0100 | 1111 0010 | 0100 0100 | 0100 0100 | 1111 0000 | 0100 0000 | 0100 0000 | 0010 1111 | 0000 0100 |
| 0010 0010 | 1111 0001 | 0010 0010 | 0010 0010 | 0000 1111 | 0010 1111 | 0010 1111 | 0010 1111 | 0000 0010 |
| 0001 0001 | 0000 0001 | 0001 0001 | 0001 0001 | 1111 0000 | 0001 1111 | 0001 1111 | 0001 1111 | 0000 0001 |

DATA BITS ← | → CHECK BITS

| 00 No Error | 20 CB5 | 40 CB6 | 60 MBE | 80 CB7 | A0 MBE | C0 MBE | E0 DB34 |
|---|---|---|---|---|---|---|---|
| 01 CB0 | 21 MBE | 41 MBE | 61 DB08 | 81 MBE | A1 DB40 | C1 DB52 | E1 MBE |
| 02 CB1 | 22 MBE | 42 MBE | 62 DB09 | 82 MBE | A2 DB41 | C2 DB53 | E2 MBE |
| 03 MBE | 23 DB01 | 43 DB02 | 63 MBE | 83 DB03 | A3 MBE | C3 MBE | E3 MBE |
| 04 CB2 | 24 MBE | 44 MBE | 64 DB10 | 84 MBE | A4 DB42 | C4 DB54 | E4 MBE |
| 05 MBE | 25 DB17 | 45 DB18 | 65 MBE | 85 DB19 | A5 MBE | C5 MBE | E5 MBE |
| 06 MBE | 26 DB49 | 46 DB50 | 66 MBE | 86 DB51 | A6 MBE | C6 MBE | E6 MBE |
| 07 DB12 | 27 MBE | 47 MBE | 67 MBE | 87 MBE | A7 MBE | C7 MBE | E7 MBE |
| 08 CB03 | 28 MBE | 48 MBE | 68 DB11 | 88 MBE | A8 DB43 | C8 DB55 | E8 MBE |
| 09 MBE | 29 DB25 | 49 DB26 | 69 MBE | 89 DB27 | A9 MBE | C9 MBE | E9 MBE |
| 0A MBE | 2A DB21 | 4A DB22 | 6A MBE | 8A DB23 | AA MBE | CA MBE | EA MBE |
| 0B DB33 | 2B MBE | 4B MBE | 6B MBE | 8B MBE | AB MBE | CB MBE | EB MBE |
| 0C MBE | 2C DB05 | 4C DB06 | 6C MBE | 8C DB07 | AC MBE | CC MBE | EC MBE |
| 0D DB13 | 2D MBE | 4D MBE | 6D MBE | 8D MBE | AD MBE | CD MBE | ED MBE |
| 0E DB32 | 2E MBE | 4E MBE | 6E MBE | 8E MBE | AE MBE | CE MBE | EE MBE |
| 0F MBE | 2F DB62 | 4F DB60 | 6F MBE | 8F DB58 | AF MBE | CF MBE | EF |
| 10 CB4 | 30 MBE | 50 MBE | 70 DB14 | 90 MBE | B0 DB35 | D0 DB15 | F0 MBE |
| 11 MBE | 31 DB44 | 51 DB28 | 71 MBE | 91 DB36 | B1 MBE | D1 MBE | F1 DB63 |
| 12 MBE | 32 DB45 | 52 DB29 | 72 MBE | 92 DB37 | B2 MBE | D2 MBE | F2 DB57 |
| 13 DB00 | 33 MBE | 53 MBE | 73 MBE | 93 MBE | B3 MBE | D3 MBE | F3 MBE |
| 14 MBE | 34 DB46 | 54 DB30 | 74 MBE | 94 DB38 | B4 MBE | D4 MBE | F4 DB59 |
| 15 DB16 | 35 MBE | 55 MBE | 75 MBE | 95 MBE | B5 MBE | D5 MBE | F5 MBE |
| 16 DB48 | 36 MBE | 56 MBE | 76 MBE | 96 MBE | B6 MBE | D6 MBE | F6 MBE |
| 17 MBE | 37 MBE | 57 MBE | 77 MBE | 97 MBE | B7 MBE | D7 MBE | F7 |
| 18 MBE | 38 DB47 | 58 DB31 | 78 MBE | 98 DB39 | B8 MBE | D8 MBE | F8 DB61 |
| 19 DB24 | 39 MBE | 59 MBE | 79 MBE | 99 MBE | B9 MBE | D9 MBE | F9 MBE |
| 1A DB20 | 3A MBE | 5A MBE | 7A MBE | 9A MBE | BA MBE | DA MBE | FA MBE |
| 1B MBE | 3B MBE | 5B MBE | 7B MBE | 9B MBE | BB MBE | DB MBE | FB |
| 1C DB04 | 3C MBE | 5C MBE | 7C MBE | 9C MBE | BC MBE | DC MBE | FC MBE |
| 1D MBE | 3D MBE | 5D MBE | 7D MBE | 9D MBE | BD MBE | DD MBE | FD |
| 1E MBE | 3E MBE | 5E MBE | 7E MBE | 9E MBE | BE MBE | DE MBE | FE |
| 1F DB56 | 3F MBE | 5F MBE | 7F | 9F MBE | BF | DF | FF MBE |

FIG. 6

| 00 No Error | 20 CB5   | 40 CB6   | 60 MBE   | 80 CB7   | A0 MBE   | C0 MBE   | E0 DB34* |
|-------------|----------|----------|----------|----------|----------|----------|----------|
| 01 CB0      | 21 MBE   | 41 MBE   | 61 DB08  | 81 MBE   | A1 DB40  | C1 DB52  | E1 MBE   |
| 02 CB1      | 22 MBE   | 42 MBE   | 62 DB09  | 82 MBE   | A2 DB41  | C2 DB53  | E2 MBE   |
| 03 MBE      | 23 DB01  | 43 DB02  | 63 MBE   | 83 DB03  | A3 MBE   | C3 MBE   | E3 MBE   |
| 04 CB2      | 24 MBE   | 44 MBE   | 64 DB10  | 84 MBE   | A4 DB42  | C4 DB54  | E4 MBE   |
| 05 MBE      | 25 DB17  | 45 DB18  | 65 MBE   | 85 DB19  | A5 MBE   | C5 MBE   | E5 MBE   |
| 06 MBE      | 26 DB49  | 46 DB50  | 66 MBE   | 86 DB51  | A6 MBE   | C6 MBE   | E6 MBE   |
| 07 DB12*    | 27 MBE   | 47 MBE   | 67 MBE   | 87 MBE   | A7 MBE   | C7 MBE   | E7 MBE   |
| 08 CB03     | 28 MBE   | 48 MBE   | 68 DB11  | 88 MBE   | A8 DB43  | C8 DB55  | E8 MBE   |
| 09 MBE      | 29 DB25  | 49 DB26  | 69 MBE   | 89 DB27  | A9 MBE   | C9 MBE   | E9 MBE   |
| 0A MBE      | 2A DB21  | 4A DB22  | 6A MBE   | 8A DB23  | AA MBE   | CA MBE   | EA MBE   |
| 0B DB33*    | 2B MBE   | 4B MBE   | 6B MBE   | 8B MBE   | AB MBE   | CB MBE   | EB MBE   |
| 0C MBE      | 2C DB05  | 4C DB06  | 6C MBE   | 8C DB07  | AC MBE   | CC MBE   | EC MBE   |
| 0D DB13*    | 2D MBE   | 4D MBE   | 6D MBE   | 8D MBE   | AD MBE   | CD MBE   | ED MBE   |
| 0E DB32*    | 2E MBE   | 4E MBE   | 6E MBE   | 8E MBE   | AE MBE   | CE MBE   | EE MBE   |
| 0F MBE      | 2F DB57  | 4F DB58  | 6F MBE   | 8F DB59  | AF MBE   | CF MBE   | EF       |
| 10 CB4      | 30 MBE   | 50 MBE   | 70 DB14* | 90 MBE   | B0 DB35* | D0 DB15* | F0 MBE   |
| 11 MBE      | 31 DB44  | 51 DB28  | 71 MBE   | 91 DB36  | B1 MBE   | D1 MBE   | F1 DB60  |
| 12 MBE      | 32 DB45  | 52 DB29  | 72 MBE   | 92 DB37  | B2 MBE   | D2 MBE   | F2 DB61  |
| 13 DB00     | 33 MBE   | 53 MBE   | 73 MBE   | 93 MBE   | B3 MBE   | D3 MBE   | F3 MBE   |
| 14 MBE      | 34 DB46  | 54 DB30  | 74 MBE   | 94 DB38  | B4 MBE   | D4 MBE   | F4 DB62  |
| 15 DB16     | 35 MBE   | 55 MBE   | 75 MBE   | 95 MBE   | B5 MBE   | D5 MBE   | F5 MBE   |
| 16 DB48     | 36 MBE   | 56 MBE   | 76 MBE   | 96 MBE   | B6 MBE   | D6 MBE   | F6 MBE   |
| 17 MBE      | 37 MBE   | 57 MBE   | 77 MBE   | 97 MBE   | B7 MBE   | D7 MBE   | F7       |
| 18 MBE      | 38 DB47  | 58 DB31  | 78 MBE   | 98 DB39  | B8 MBE   | D8 MBE   | F8 DB63  |
| 19 DB24     | 39 MBE   | 59 MBE   | 79 MBE   | 99 MBE   | B9 MBE   | D9 MBE   | F9 MBE   |
| 1A DB20     | 3A MBE   | 5A MBE   | 7A MBE   | 9A MBE   | BA MBE   | DA MBE   | FA MBE   |
| 1B MBE      | 3B MBE   | 5B MBE   | 7B MBE   | 9B MBE   | BB MBE   | DB MBE   | FB       |
| 1C DB04     | 3C MBE   | 5C MBE   | 7C MBE   | 9C MBE   | BC MBE   | DC MBE   | FC MBE   |
| 1D MBE      | 3D MBE   | 5D MBE   | 7D MBE   | 9D MBE   | BD MBE   | DD MBE   | FD       |
| 1E MBE      | 3E MBE   | 5E MBE   | 7E MBE   | 9E MBE   | BE MBE   | DE MBE   | FE       |
| 1F DB56     | 3F MBE   | 5F MBE   | 7F       | 9F MBE   | BF       | DF       | FF MBE   |

ADDRESS BITS

| | 11 1111 1111 2222 2222 2233 | | |
|---|---|---|---|
| 0123 4567 | 8901 2345 | 6789 0123 | 4567 8901 |
| xxx1 1110 | 0001 1110 | 0111 0011 | 1011 xxxx |
| xxx1 1111 | 1110 0000 | 0111 0111 | 1100 xxxx |
| xxx1 1110 | 0001 1111 | 1000 1101 | 0111 xxxx |
| xxx0 0001 | 1111 1111 | 1100 1010 | 1011 xxxx |
| xxx1 1001 | 1101 1001 | 0111 1001 | 1110 xxxx |
| xxx1 0101 | 1011 0101 | 1111 0100 | 0101 xxxx |
| xxx0 1111 | 0110 1010 | 1010 1110 | 0101 xxxx |
| xxx0 0010 | 1110 0111 | 1001 1111 | 1010 xxxx |

DATA BITS ———————————————————————————————————————————→ | ←CHECK BITS→

| | 11 1111 1111 2222 2222 2233 3333 3333 4444 4444 4455 5555 5555 66cc 66cc | | | | | | | | | | |
|---|---|---|---|---|---|---|---|---|---|---|---|
| 0123 4567 | 8901 2345 | 6789 0123 | 2345 6789 | 4567 8901 | 0123 4567 | 8901 2345 | 6707 8916 | 0125 2334 |
| 1111 0000 | 1000 1100 | 1111 0000 | 1111 1000 | 0100 1000 | 1000 1000 | 0000 1000 | 1010 1000 | 1000 1100 |
| 1111 0000 | 0100 1000 | 0000 1111 | 0000 1111 | 1100 0100 | 0100 0100 | 1111 0100 | 1100 1010 | 1000 1000 |
| 0000 1111 | 0010 1100 | 1111 0000 | 1111 0000 | 1000 0010 | 0010 0010 | 1111 0010 | 1000 1100 | 1010 1000 |
| 0000 1111 | 0001 0100 | 0000 1111 | 1111 0000 | 1100 0001 | 0001 0001 | 0000 0001 | 1000 1100 | 1010 1010 |
| 1000 1000 | 0000 0011 | 1000 1000 | 0001 1111 | 0001 1111 | 0000 1111 | 1000 0000 | 1100 1000 | 1100 1010 |
| 0100 0100 | 1111 0010 | 0100 0100 | 0001 0000 | 1111 1111 | 1111 1111 | 0100 0000 | 0100 0100 | 0101 0101 |
| 0010 0010 | 1111 0001 | 0010 0010 | 0010 0000 | 0011 0000 | 0000 0000 | 0010 1111 | 0100 0100 | 1100 1100 |
| 0001 0001 | 0000 0001 | 0001 0000 | 0001 0000 | 0011 1111 | 1111 0000 | 0001 0000 | 0101 1100 | 0100 0100 |

| 00 No Error | 20 CB5    | 40 CB6    | 60 UNCER | 80 CB7    | A0 UNCER | C0 UNCER | E0 DB34  |
|-------------|-----------|-----------|----------|-----------|----------|----------|----------|
| 01 CB0      | 21 UNCER  | 41 UNCER  | 61 DB08  | 81 UNCER  | A1 DB40  | C1 DB52  | E1 UNCER |
| 02 CB1      | 22 UNCER  | 42 UNCER  | 62 DB09  | 82 UNCER  | A2 DB41  | C2 DB53  | E2 UNCER |
| 03 UNCER    | 23 DB01   | 43 DB02   | 63 UNCER | 83 DB03   | A3 UNCER | C3 UNCER | E3 UNCER |
| 04 CB2      | 24 UNCER  | 44 UNCER  | 64 DB10  | 84 UNCER  | A4 DB42  | C4 DB54  | E4 UNCER |
| 05 UNCER    | 25 DB17   | 45 DB18   | 65 UNCER | 85 DB19   | A5 UNCER | C5 UNCER | E5 UNCER |
| 06 UNCER    | 26 DB49   | 46 DB50   | 66 UNCER | 86 DB51   | A6 UNCER | C6 UNCER | E6 UNCER |
| 07 DB12     | 27 UNCER  | 47 UNCER  | 67 UNCER | 87 UNCER  | A7 UNCER | C7 UNCER | E7 UNCER |
| 08 CB03     | 28 UNCER  | 48 UNCER  | 68 DB11  | 88 UNCER  | A8 DB43  | C8 DB55  | E8 UNCER |
| 09 UNCER    | 29 DB25   | 49 DB26   | 69 UNCER | 89 DB27   | A9 UNCER | C9 UNCER | E9 UNCER |
| 0A UNCER    | 2A DB21   | 4A DB22   | 6A UNCER | 8A DB23   | AA UNCER | CA UNCER | EA UNCER |
| 0B DB33     | 2B UNCER  | 4B UNCER  | 6B UNCER | 8B UNCER  | AB UNCER | CB UNCER | EB UNCER |
| 0C UNCER    | 2C DB05   | 4C DB06   | 6C UNCER | 8C DB07   | AC UNCER | CC UNCER | EC UNCER |
| 0D DB13     | 2D UNCER  | 4D UNCER  | 6D UNCER | 8D UNCER  | AD UNCER | CD UNCER | ED UNCER |
| 0E DB32     | 2E UNCER  | 4E UNCER  | 6E UNCER | 8E UNCER  | AE UNCER | CE UNCER | EE UNCER |
| 0F UNCER    | 2F DB62   | 4F DB60   | 6F UNCER | 8F DB58   | AF UNCER | CF UNCER | EF       |
| 10 CB4      | 30 UNCER  | 50 UNCER  | 70 DB14  | 90 UNCER  | B0 DB35  | D0 DB15  | F0 UNCER |
| 11 UNCER    | 31 DB44   | 51 DB28   | 71 UNCER | 91 DB36   | B1 UNCER | D1 UNCER | F1 DB63  |
| 12 UNCER    | 32 DB45   | 52 DB29   | 72 UNCER | 92 DB37   | B2 UNCER | D2 UNCER | F2 DB57  |
| 13 DB00     | 33 UNCER  | 53 UNCER  | 73 UNCER | 93 UNCER  | B3 UNCER | D3 UNCER | F3 UNCER |
| 14 UNCER    | 34 DB46   | 54 DB30   | 74 UNCER | 94 DB38   | B4 UNCER | D4 UNCER | F4 DB59  |
| 15 DB16     | 35 UNCER  | 55 UNCER  | 75 UNCER | 95 UNCER  | B5 UNCER | D5 UNCER | F5 UNCER |
| 16 DB48     | 36 UNCER  | 56 UNCER  | 76 UNCER | 96 UNCER  | B6 UNCER | D6 UNCER | F6 UNCER |
| 17 UNCER    | 37 UNCER  | 57 UNCER  | 77 UNCER | 97 UNCER  | B7 UNCER | D7 UNCER | F7       |
| 18 UNCER    | 38 DB47   | 58 DB31   | 78 UNCER | 98 DB39   | B8 UNCER | D8 UNCER | F8 DB61  |
| 19 DB24     | 39 UNCER  | 59 UNCER  | 79 UNCER | 99 UNCER  | B9 UNCER | D9 UNCER | F9 UNCER |
| 1A DB20     | 3A UNCER  | 5A UNCER  | 7A UNCER | 9A UNCER  | BA UNCER | DA UNCER | FA UNCER |
| 1B UNCER    | 3B UNCER  | 5B UNCER  | 7B UNCER | 9B UNCER  | BB UNCER | DB UNCER | FB       |
| 1C DB04     | 3C UNCER  | 5C UNCER  | 7C UNCER | 9C UNCER  | BC UNCER | DC UNCER | FC UNCER |
| 1D UNCER    | 3D UNCER  | 5D UNCER  | 7D UNCER | 9D UNCER  | BD UNCER | DD UNCER | FD       |
| 1E UNCER    | 3E UNCER  | 5E UNCER  | 7E UNCER | 9E UNCER  | BE UNCER | DE UNCER | FE       |
| 1F DB56     | 3F UNCER  | 5F UNCER  | 7F       | 9F UNCER  | BF       | DF       | FF UNCER |

FIG. 10

ERROR CORRECTION CODES

FIELD OF THE INVENTION

The invention relates to error correction for a computer.

BACKGROUND OF THE INVENTION

The memory subsystems of today's computers are under ever-increasing demands for capacity and speed. As speed increases, memory subsystems become increasingly vulnerable to errors caused by transient electrical and electromagnetic phenomena. Therefore, although a well-designed memory subsystem is extremely reliable, even the best memory subsystem has the possibility of a memory device failure.

Memory device failures fall generally into two categories. The first is a soft error, which refers to those errors where data stored at a given memory location change, but where subsequent accesses can store the correct data to the same location with no more likelihood of returning incorrect data than from any other location. Soft errors of this type are generally caused by loss of charge in the DRAM cell. The second type of error is a hard error, which refers to those errors in which data can no longer reliably be stored at a given memory location. Either of these types of errors can lead to catastrophic failure of the memory subsystem.

In an effort to minimize failures due to memory subsystem errors, various error checking schemes have been developed to detect, and in some cases correct, errors in data read from memory. The most simple of the error checking schemes is parity. In a byte-wide parity system, one extra parity bit is appended to every eight bits of data. For "even parity" systems, the parity bit is set such that the total number of ones in the nine-bit word is even. For "odd parity" systems, the parity bit is set to make the total number of ones odd. When data is read from memory, if one of the nine bits changes from one to zero or vise versa, the parity will be incorrect and the error will be detected. This system is limited, however, because there is no way to know which of the nine bits changed. Therefore, single bit errors can only be detected, not corrected. Also, if two bits change, the parity will again be correct and no error will be detected. Parity therefore is capable of detecting only odd numbers of bit errors.

While detection of errors is very useful, it also is desirable to be able to correct certain errors. Error correcting codes ("ECCs") have been developed that both detect and correct certain errors. Generally speaking, the goal of an ECC is to correct the largest possible number of errors with the smallest possible overhead (in terms of extra bits and wait states) to the system.

The "Hamming codes" constitute one well-known class of ECCs and are widely used for error control in digital communications and data storage systems. A detailed description of the Hamming Codes is found in Lin et al., "Error Control Coding, *Fundamentals and Applications*", Chapter 3 (1982). One subclass of the Hamming codes that is particularly well-suited for memory subsystems includes the single-error-correcting and double-error detecting (SEC-DED) codes. In these codes, the check bits are generated prior to data being written to memory using a parity-check matrix implemented in ECC hardware. In the (72, 64) Hamming code, 8 check bits are generated for 64 bits of data. The check bits are then stored in memory together with the data. When a memory read occurs, the ECC hardware retrieves both the data and the corresponding check bits from memory. The ECC hardware then applies the parity check matrix to the data and the check bits, producing "syndrome bits". If the syndrome bits are all zeros, this indicates there are no errors. If the syndrome bits contain ones, the data are possibly invalid. In the case of a single bit error, the syndrome bits will indicate which bit is in error, and thus allow correction. In the case of double bit errors, the error will be detected, but correction is not possible. A complete description of the SEC-DED Hamming codes is found in Lin et al, supra, chapter 16.

Another well-known ECC is the "Reed-Solomon code", widely used for error correction in the compact disk industry. A detailed description of this ECC is found in Hove et al., "Error Correction and Concealment in the Compact Disc System", *Philips Technical Review*, Vol. 40 (1980), No. 6, pages 166–172. The Reed-Solomon code is able to correct two errors per code word. Other conventional ECCs include the b-adjacent error correction code described in Bossen, "b-Adjacent Error Correction", *IBM J. Res. Develop.*, pp. 402–408 (July, 1970), and the odd weight column codes described in Hsiao, "A Class of Optimal Minimal Odd Weight Column SEC-DED Codes", *IBM J. Res. Develop.*, pp. 395–400 (July, 1970). The Hsiao codes, like the Hamming codes, are capable of detecting double bit errors and correcting single bit errors. The Hsiao codes uses the same number of check bits as the Hamming codes (e.g., 8 check bits for 64 bits of data), but are superior in that hardware implementation is simplified and the speed of error-detection is improved.

One ECC that is particularly advantageous for application to computer memory subsystems is described in co-pending and commonly assigned U.S. Pat. No. 5,490,155, titled "ERROR CORRECTION SYSTEM FOR N BITS USING ERROR CORRECTION CODE DESIGNED FOR FEWER THAN N BITS", the disclosure of which is hereby incorporated by reference. The ECC described in this prior application, when coupled with a particular data distribution architecture, obtains the advantages of the Hamming codes (SEC-DED) with the same overhead (8 check bits for 64 bits of data), but also is able to correct any single 4-bit wide error. Thus, for a memory subsystem implemented using four-bit dynamic random access memories (X4 DRAMS), the subsystem can withstand complete failure of a single X4 DRAM device with full data correction capability.

SUMMARY OF THE INVENTION

The present invention includes a method of detecting and correcting errors in a computer, comprising the steps of: beginning a write operation of N data bits to a memory; generating M check bits from the N data bits; writing the N data bits and the M check bits to the memory; reading the N data bits and M check bits from the memory; generating X syndrome bits from the N data bits and the M check bits; and using the X syndrome bits to detect and correct any single bit error within the N data bits and the M check bits, to detect any double bit error within the N data bits and the M check bits, and to detect any four bit error within four adjacent bits of the N data bits.

Another aspect of the invention includes a method of detecting and correcting errors in a computer, comprising the steps of: beginning a write operation of N data bits to a memory at a location designated by A address bits; generating M check bits from the N data bits and the A address bits; writing the N data bits and the M check bits to the location; reading the N data bits and M check bits from the location; generating X syndrome bits from the N data bits, the M check bits, and the A address bits; and using the X syndrome bits to detect any single bit error within the A address bits.

A further aspect of the invention includes an error detecting and correcting apparatus for a computer having a CPU and a memory, comprising a means for generating M check bits from N data bits upon initiation of a write operation of the N bits from the CPU to the memory; a means for writing the N data bits and the M check bits to the memory; a means for generating X syndrome bits from the N data bits and the M check bits upon initiation of a read operation of the N bits and the M check bits from the memory; and a means for using the X syndrome bits to detect and correct any single bit error within the N data bits and the M check bits, to detect any double bit error within the N data bits and the M check bits, and to detect any four bit error within four adjacent bits of the N data bits.

A further aspect of the invention includes an error detecting and correcting apparatus for a computer having a CPU and a memory, which comprises a means for generating M check bits from N data bits and A address bits upon initiation of a write operation from the CPU a location in the memory designated by the A address bits, a means for writing the N data bits and the M check bits to the location in memory, a means for generating X syndrome bits from the N data bits, the M check bits, and the A address bits upon initiation of a read operation from the location in the memory; and a means for using the X syndrome bits to detect any single bit error within the A address bits.

Another aspect of the invention includes an error detecting and correcting apparatus for a computer having a CPU and a memory, which comprises a means for generating M check bits from N data bits upon initiation of a write operation of the N bits from the CPU to the memory, a means for writing the N data bits and the M check bits to the memory, a means for generating X syndrome bits from the N data bits and the M check bits upon initiation of a read operation of the N bits and the M check bits from the memory, a means for using the X syndrome bits to detect errors within the N data bits. This means for generating the M check bits and the means for generating the X syndrome bits comprise a first ECC module and a second ECC module, the first ECC module generating one half of the M check bits and the X syndrome bits and the second ECC module generating the other half of the M check bits and the X syndrome bits. This means further comprises a means for communicating partially generated check bits and syndrome bits between the first and second ECC modules.

BRIEF DESCRIPTION OF THE DRAWING

FIG. 5 is a parity-check matrix in accordance with one embodiment of the invention;

FIG. 6 is a syndrome table in accordance with the embodiment of FIG. 5;

FIG. 7 is a parity-check matrix in accordance with another embodiment of the invention;

FIG. 8 is a syndrome table in accordance with the embodiment of FIG. 7;

FIG. 10 is a syndrome table in accordance with the embodiment of FIG. 9.

DESCRIPTION OF THE PREFERRED EMBODIMENTS

Preferred embodiments will now be described with reference to the accompanying figures.

Figure 1:
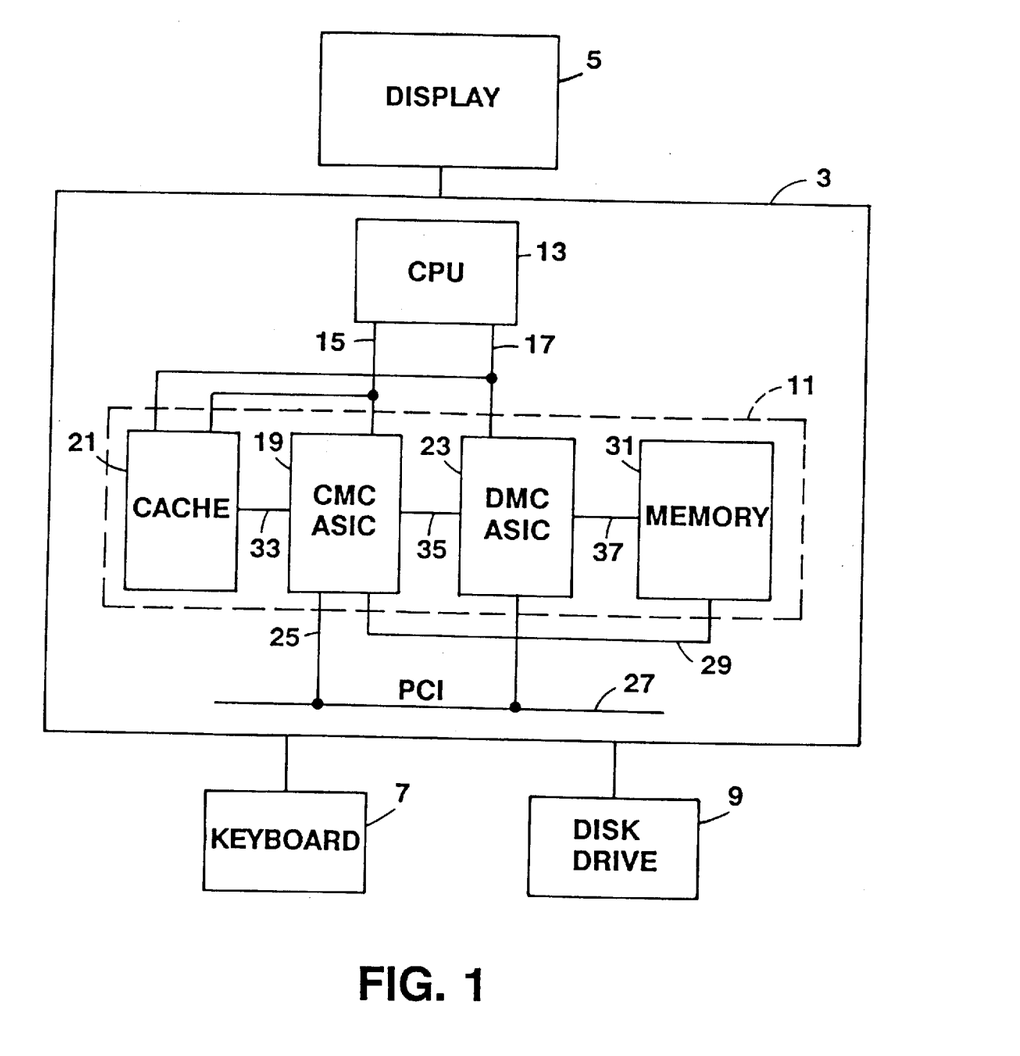
FIG. 1 is a block diagram of a conventional memory subsystem.

FIG. 1 is a block diagram representation of a conventional memory subsystem 11 for a computer 3. The computer 3 is associated with a display 5, a keyboard 7, and a disk drive 9 in a conventional fashion. The memory subsystem 11 communicates with a central processing unit (CPU) 13 having an address bus 15 and a data bus 17. The address bus 15 is connected to a cache and memory control (CMC) application specific integrated circuit (ASIC) 19. The data bus 17 is connected to cache memory 21 and to a data memory control (DMC) 23. CMC 19 has an address bus 25 that communicates with a peripheral component interface (PCI) 27 and a memory address bus 29 that communicates with memory 31. CMC 19 communicates with cache 21 via bus 33 and with DMC 23 via bus 35. DMC 23 also communicates with memory 31 via data bus 37.

Figure 2:
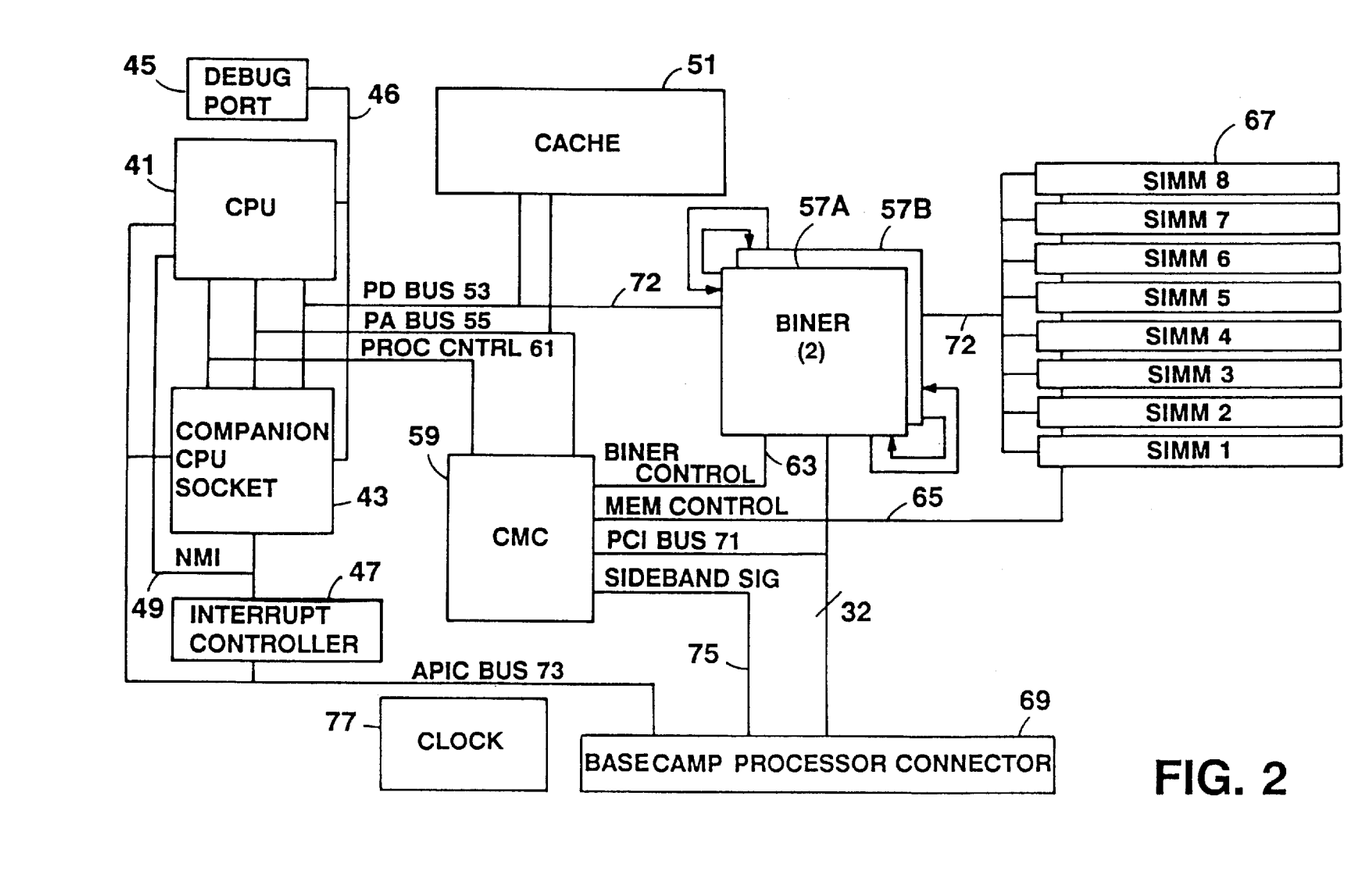
FIG. 2 is a block diagram of a processor and memory system in accordance with the invention.

FIG. 2 is a block diagram representation of a processor and memory system in accordance with the present invention. The system comprises a CPU 41, which is preferably the P54C processor available from Intel. A companion CPU socket is also provided for dual processor implementations, and is preferably the P54CM socket available from Intel. Both CPU 41 and companion CPU socket 43 communicate with a debug port 45 via a debug signal line 46 and with an interrupt controller 47 via a non-maskable interrupt (NMI) line 49.

On-board cache 51 is provided, preferably 512K L2 cache, which communicates with CPU 41 via processor data (PD) bus 53 and processor address (PA) bus 55. The PD bus 53 is 72 bits wide, and is also applied to two special purpose data path ASICs called "BINERs" (57A, 57B). CMC 59 communicates with PA bus 55 and also with processor control bus 61. CMC provides BINER control line 63 to BINERs 57A, 57B and also memory control line 65 to memory 67. Memory 67 comprises eight 72 bit SIMMs, SIMM 1–SIMM 8. A basecamp processor connector 69 provides peripheral interface for both the PCI bus 71 and APIC bus 73. Additional control signals are provided from the CMC 59 to the connector 69 via sideband signal line 75. A clock 77 provides system timing.

Figure 3:
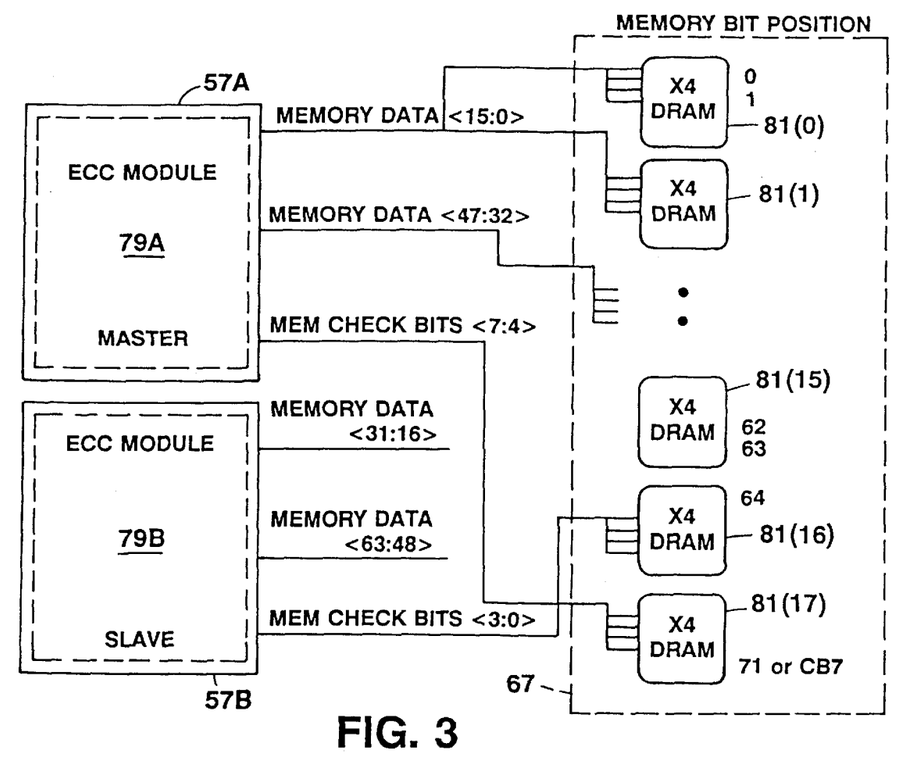
FIG. 3 is a block diagram of an ECC system in accordance with FIG. 2.

Referring now to FIG. 3, an ECC module is implemented within each of BINER 57A, 57B. The modules are identical, but one is designated as master (79A) and the other as slave (79B). Modules 79A, 79B together provide 64 bits of data and eight check bits to memory 67, implemented in the form of 18 X4 DRAM devices (81). For the sake of simplicity, only five of the DRAM devices are shown in FIG. 3 (DRAM 81(0), 82(1), and 81(15–17)). ECC master module 79A provides memory data bits 0–15 and 32–47 to X4 DRAMs 81(0–7), respectively. Module 79A also provides memory check bits 4–7 to X4 DRAM device 81(17). ECC slave module 79B provides memory data bits 16–31 and 48–63 to X4 DRAM devices 81(8–15), respectively, and also provides memory check bits 0–3 to X4 DRAM device 81(16).

Figure 4:
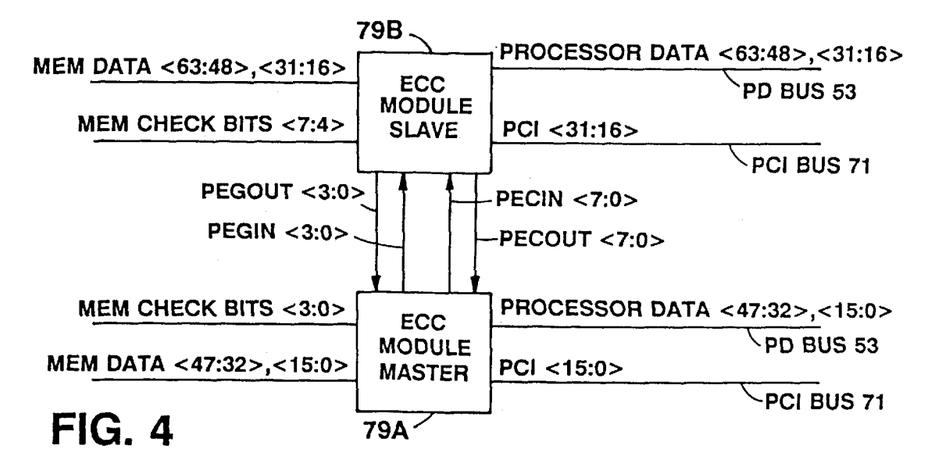
FIG. 4 is a block diagram showing interconnection between the ECC modules of FIG. 3.

FIG. 4 is another diagram illustrating the interplay between ECC slave module 79B and ECC master module 79A. Master module 79A receives processor data bits 0–15 and 32–47 from the PD bus 53. ECC slave module 79B receives processor data bits 16–31 and 48–63, also from PD bus 53. The 32 bits of the PCI bus 71 are also split between the two modules, with bits 0–15 going to master module 79A and bits 16–31 going to slave module 79B. In order to generate the correct syndrome code in accordance with the embodiments described in detail below, each ECC module decodes a total of 32 bits of data and four check bits. In addition, each module needs to provide the other with its own four check bits. Therefore, as shown in FIG. 4, each module drives the partial four check bits via PEGOUT<3:0> and receives the four partial check bits via PEGIN<3:0>. A total of eight pins are used to transfer partial check bits to generate proper syndrome/check bits. When an error is detected and is correctable, a total of eight syndrome bits must be transferred between the two modules. The syndrome bits are driven via PECOUT<7:0> and received via PECIN<7:0>.

This transfer of partial check bits and syndrome codes between the two modules, and the division of labor between the two modules, can be avoided if an ASIC package is used of sufficient capacity to implement all of the ECC logic in a single chip. The choice of whether to use two modules or a single ASIC is driven primarily by cost considerations and the availability of large scale ASICs. Clearly, if a single ASIC is used, the design is simplified and there is some reduction in overhead due to the exchange of partial check bits and syndrome codes no longer being necessary.

FIG. 5 illustrates the parity-check matrix for an error correction code in accordance with one embodiment of the invention. As with the (72, 64) Hsiao codes, and the codes described in the prior U.S. Pat. No. 5,490,153 the ECC in accordance with this embodiment is able to correct random single bit errors and detect random double bit errors. In addition, the ECC in accordance with this embodiment is able to detect all three and four bit errors within the same nibble without requiring additional check bits.

In this embodiment, a pair of check bits and data bits are mixed into the same nibble to ensure that the multiple-bit syndrome codes are not mapped into the same syndrome codes of the single-bit errors. There are 72 distinct syndrome codes assigned for the single-bit correctable errors. Thus, there are only 183 possible syndrome codes to use for detecting a total of 2646 cases of multiple-bit errors (2556 cases for the random double-bit errors, 72 cases for the 3-bit errors, and 18 cases for the 4-bit per nibble errors). Therefore, most of the multiple-bit syndrome codes are shared by several error conditions.

To generate the check bits from 64 data bits, an exclusive OR (XOR) operation is performed on the data bits in the locations of each row in the matrix of FIG. 5 having ones. Implementation of the XOR function within an ASIC using Boolean logic is straightforward, and will not be described herein in detail. Performing this operation for each of the 8 rows produces the 8 check bits. In accordance with the implementation shown in FIGS. 3 and 4, it will be understood that this operation is actually performed in two halfs, one by each ECC module. For the sake of simplicity in the following discussion, however, the ECC process will be described as a single operation.

The 64 bits of data and 8 check bits are then written to memory 31. In order to detect 4-bit errors, all 4-bits from each X4 DRAM device must connect to the same ECC module with correct ordering, as described above with reference to FIG. 3.

When a read operation occurs, the 64 data bits and 8 check bits are read from memory, and the XOR operation is again performed on each row, this time including all 72 bits. By performing this operation on each of the 8 rows of the matrix of FIG. 5, 8 syndrome bits S(0–7) are produced.

FIG. 6 illustrates the syndrome table corresponding to this embodiment. As indicated in the upper left hand corner of the table, if all 8 syndrome bits are all zero (00 in hex), no error is detected. If the syndrome bits contain ones, either a single bit (DB), check bit (CB) or multiple bit error (MBE) is detected. As is apparent from FIG. 6, if the error is a single bit error, i.e., either a single data bit error or a single check bit error, the bit in error is determined by the syndrome table and can be corrected. For multiple bit errors, the error is detected but not corrected, and preferably a report of the error is made to the operating system.

For some applications, having check bits and data bits grouped in the same nibble may increase hardware requirements by limiting the choice of certain types of DRAMS, or may add an additional wait state. For such applications, a second embodiment of the invention has been developed wherein the check bits are grouped together and are separated from the data bits. This embodiment maintains the advantages of the embodiment described above, however, the three-bit error detection is no longer applied to the check bits (nibbles 16 and 17). Any three-bit error of the check bits will cause a mis-correction of one of data bits 12–15 or 32–35.

The parity-check matrix for the second embodiment of the invention is shown in FIG. 7, and its corresponding syndrome table is shown in FIG. 8. Coding and decoding in accordance with this embodiment is identical to that described above with respect to the first embodiment, and will not be repeated.

In both the first and second embodiments, the parity-check matrices are optimized by having the same number of ones (27) in each row. In addition, the total number of ones in the matrices is minimized to reduce hardware requirements.

The first and second embodiments of the invention described above apply error checking to the memory data bus only. However, the error correction code of the invention can also be applied advantageously to the address portion without requiring additional check bits. If one were to try to apply an error detection scheme directly to the memory address bus, even a simple scheme like parity, the hardware cost of the extra bit most likely would be prohibitive. Even if one could afford the cost of an extra bit for parity, only odd numbers of bit errors could be detected. In accordance with the present invention, available syndrome codes can be employed to detect all random single and double bit errors on the address bus without requiring additional bits. Thus error detection capabilities are realized on both processor and memory address buses at essentially zero cost in terms of overhead.

Figure 9:
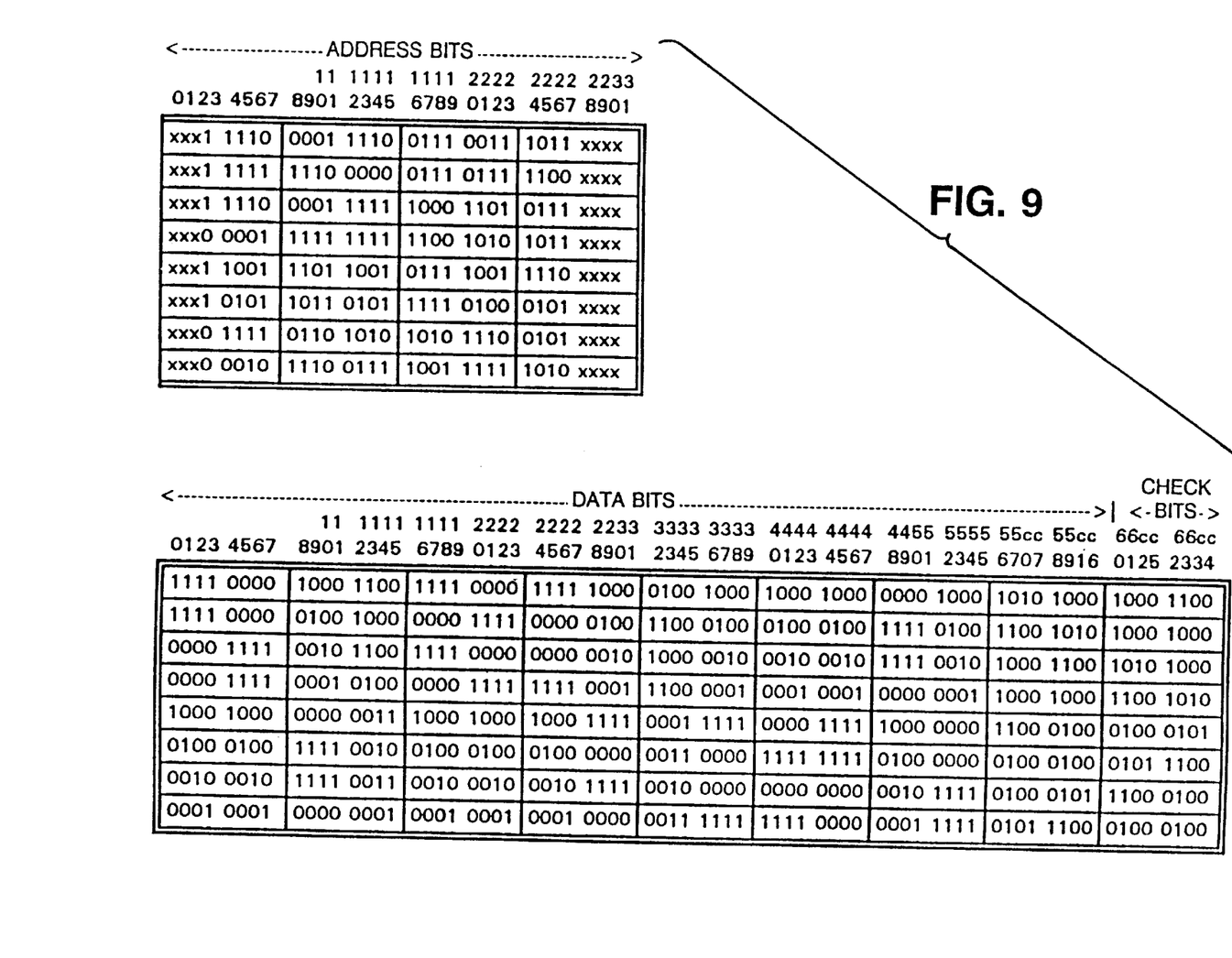
FIG. 9 is a parity-check matrix in accordance with yet another embodiment of the invention.

The parity-check matrix for this third embodiment of the invention is shown in FIG. 9, where "x" indicates addresses that are not covered (the first 3 address bits are excluded because the memory word size is 64 bits wide; the last 4 address bits are excluded because in this embodiment the maximum supported memory size is 256 MB). The corresponding syndrome table is shown in FIG. 10, where "UNCER" refers to an un-correctable error. Generation of the check bits and syndrome bits is the same as that described above with respect to the first embodiment, and will not be repeated. However, because the address bits are also coded in this embodiment, the CMC 59 must transfer the address information to the BINERs for encoding and decoding purposes during CPU read or writeback cycles. One option for achieving this transfer is to transfer all of the address bits from the CMC 59 to the BINERs 57A, 57B via line 63. This is the most direct approach, but as a practical matter pin limitations (typically 4 bits) may result in an excessive number of clock cycles being needed to transfer all 25 address bits. These extra clock cycles could degrade CPU performance.

Another approach is to generate the syndrome bits for the address portion within the CMC 59, and then transfer these 8 partial syndrome bits to the BINERs for encoding or decoding. This requires only two clock cycles, which will not add additional overhead to the normal memory cycles. This approach does, however, require some additional logic in the CMC 59.

For the address portion, the error correction code of this embodiment detects, but does not correct, single and double-bit errors. Correction on the address bus is not possible because a single bit error on the address bus will result in invalid data being returned—thus making it impossible to generate the syndrome bits. Detection of single and double-bit errors is, however, both adequate and highly advantageous because, when errors are detected on the memory address bus, the CMC can terminate and abort the current cycle without returning the data to the requester. Accordingly, further corruption is prevented. Also, information regarding the errors, both on the address bus and on the data bus, can be reported to the operating system or to a special archive.

Reporting of errors is a very useful function because it provides important information about the faults to the users or to service personnel. This allows faults to be easily isolated, thus minimizing the system's down time. In accordance with the invention, any error that is detected or corrected can be reported to the operating system or stored in a special archive for later use during servicing.

Various embodiments of the invention have been described above in detail with reference to the accompanying figures. However, the invention is not so limited. One of ordinary skill in the art will recognize that the error correction methods, hardware, and codes described may be applied to different memory and data communication systems, different processors with various bit widths, and in various combinations and permutations. Accordingly, the invention is not limited to the described embodiments, but rather is limited only by the scope of the appended claims.

What is claimed is:

1. A method of detecting and correcting errors in a computer, comprising the steps of:

beginning a write operation of N data bits to a memory;

generating M check bits from said N data bits;

writing said N data bits and said M check bits to the memory;

reading said N data bits and M check bits from the memory;

generating X syndrome bits from said N data bits and said M check bits;

using said X syndrome bits to detect and correct any single bit error within said N data bits and said M check bits, to detect any double bit error within said N data bits and said M check bits, and to detect any four bit error within four adjacent bits of said N data bits.

2. The method of claim 1, further comprising the step of using said X syndrome bits to detect any four bit error within four adjacent bits of said M check bits.

3. The method of claim 1, further comprising the step of using said X syndrome bits to detect any three bit error within four adjacent bits of said N data bits.

4. The method of claim 3, further comprising the step of using said X syndrome bits to detect any three bit error within four adjacent bits of said M check bits.

5. The method of claim 1, wherein N=64, M=8, and X =8.

6. The method of claim 5, wherein said check bits and said syndrome bits are determined by the parity-check matrix:

| Data Bits [and Check Bits] | | | | | | | | | | Data & Check Bits |
|---|---|---|---|---|---|---|---|---|---|---|
| 0123 4567 | 11 1111 8901 2345 | 1111 2222 6789 0123 | 2222 2233 4567 8901 | 3333 3333 2345 6789 | 4444 4444 0123 4567 | 4455 5555 8901 2345 | 55cc 55cc 6707 8916 | | 66cc 66cc 0125 2334 |
| 1111 0000 | 1000 1100 | 1111 0000 | 1111 1000 | 0100 1000 | 1000 1000 | 0000 1000 | 1010 1000 | | 1000 1100 |
| 1111 0000 | 0103 1000 | 0000 1111 | 0000 0100 | 1100 0100 | 0100 0100 | 1111 0100 | 1100 1010 | | 1000 1000 |
| 0000 1111 | 0010 1100 | 1111 0000 | 0000 0010 | 1006 0010 | 0010 0010 | 1111 0010 | 1000 1100 | | 1010 1000 |
| 0000 1111 | 0001 0100 | 0000 1111 | 1111 0001 | 1100 0001 | 0001 0001 | 0001 0000 | 1000 1000 | | 1100 1010 |
| 1000 1000 | 0000 0011 | 1000 1000 | 1000 1111 | 0001 1111 | 0000 1111 | 1000 0000 | 1100 0100 | | 0100 0101 |
| 0100 0100 | 1111 0010 | 0100 0100 | 0100 0006 | 0011 0000 | 1111 1111 | 0100 0000 | 0100 0100 | | 0101 1100 |
| 0010 0010 | 1111 0011 | 0010 0010 | 0010 1111 | 0010 0000 | 0000 0000 | 0010 1111 | 0100 0101 | | 1100 0100 |
| 0001 0001 | 0000 0001 | 0001 0001 | 0001 0000 | 0011 1111 | 1111 0000 | 0001 1111 | 0101 1100 | | 0100 0100 |

7. The method of claim 6, wherein said step of detecting and correcting is performed using the syndrome table:

| | | | | | | | |
|---|---|---|---|---|---|---|---|
| 00 No Error | 20 CB5 | 40 CB6 | 60 MBE | 80 CB7 | A0 MBE | C0 MBE | E0 DB34 |
| 01 CBO | 21 MBE | 41 MBE | 61 DB08 | 81 MBE | A1 DB40 | C1 DB52 | E1 MBE |
| 02 CB1 | 22 MBE | 42 MBE | 62 DB09 | 82 MBE | A2 DB41 | C2 DB53 | E2 MBE |
| 03 MBE | 23 DB01 | 43 DB02 | 63 MBE | 83 DB03 | A3 MBE | C3 MBE | E3 MBE |
| 04 CB2 | 24 MBE | 44 MBE | 64 DB10 | 84 MBE | A4 DB42 | C4 DB54 | E4 MBE |
| 05 MBE | 25 DB17 | 45 DB18 | 65 MBE | 85 DB19 | A5 MBE | C5 MBE | E5 MBE |
| 06 MBE | 26 DB49 | 46 DB50 | 66 MBE | 86 DB51 | A6 MBE | C6 MBE | E6 MBE |
| 07 DB12 | 27 MBE | 47 MBE | 67 MBE | 87 MBE | A7 MBE | C7 MBE | E7 MBE |
| 08 CB03 | 28 MBE | 48 MBE | 68 DB11 | 88 MBE | A8 DB43 | C8 DB55 | E8 MBE |
| 09 MBE | 29 DB25 | 49 DB26 | 69 MBE | 89 DB27 | A9 MBE | C9 MBE | E9 MBE |
| OA MBE | 2A DB21 | 4A DB22 | 6A MBE | 8A DB23 | AA MBE | CA MBE | EA MBE |

-continued

| | | | | | | | |
|---|---|---|---|---|---|---|---|
| 0B DB33 | 2B MBE | 4B MBE | 6B MBE | 8B MBE | AB MBE | CB MBE | EB MBE |
| 0C MBE | 2C DB05 | 4C DB06 | 6C MBE | 8C DB07 | AC MBE | CC MBE | EC MBE |
| 0D DB13 | 2D MBE | 4D MBE | 6D MBE | 8D MBE | AD MBE | CD MBE | ED MBE |
| 0E DB32 | 2E MBE | 4E MBE | 6E MBE | 8E MBE | AE MBE | CE MBE | EE MBE |
| 0F MBE | 2F DB62 | 4F DB60 | 6F MBE | 8F DB58 | AF MBE | CF MBE | EF |
| 10 CB4 | 30 MBE | 50 MBE | 70 DB14 | 90 MBE | B0 DB35 | D0 DB15 | F0 MBE |
| 11 MBE | 31 DB44 | 51 DB28 | 71 MBE | 91 DB36 | B1 MBE | D1 MBE | F1 DB63 |
| 12 MBE | 32 DB45 | 52 DB29 | 72 MBE | 92 DB37 | B2 MBE | D2 MBE | F2 DB57 |
| 13 DBOO | 33 MBE | 53 MBE | 73 MBE | 93 MBE | B3 MBE | D3 MBE | F3 MBE |
| 14 MBE | 34 DB46 | 54 DB30 | 74 MBE | 94 DB38 | B4 MBE | D4 MBE | F4 DB59 |
| 15 DB16 | 35 MBE | 55 MBE | 75 MBE | 95 MBE | B5 MBE | D5 MBE | F5 MBE |
| 16 DB48 | 36 MBE | 56 MBE | 76 MBE | 96 MBE | B6 MBE | D6 MBE | F6 MBE |
| 17 MBE | 37 MBE | 57 MBE | 77 MBE | 97 MBE | B7 MBE | D7 MBE | F7 |
| 18 MBE | 38 DB47 | 58 DB31 | 78 MBE | 98 DB39 | B8 MBE | D8 MBE | F8 DB61 |
| 19 DB24 | 39 MBE | 59 MBE | 79 MBE | 99 MBE | B9 MBE | D9 MBE | F9 MBE |
| 1A DB20 | 3A MBE | 5A MBE | 7A MBE | 9A MBE | BA MBE | DA MBE | FA MBE |
| 1B MBE | 3B MBE | 5B MBE | 7B MBE | 9B MBE | BB MBE | DB MBE | FB |
| 1C DB04 | 3C MBE | 5C MBE | 7C MBE | 9C MBE | BC MBE | DC MBE | FC MBE |
| 1D MBE | 3D MBE | 5D MBE | 7D MBE | 9D MBE | BD MBE | DD MBE | FD |
| 1E MBE | 3E MBE | 5E MBE | 7E MBE | 9E MBE | BE MBE | DE MBE | FE |
| 1F DB56 | 3F MBE | 5F MBE | 7F | 9F MBE | BF | DF | FF MBE |

8. The method of claim 5, wherein said check bits and said syndrome bits are determined by the parity check $$$$$ matrix:

| Data Bits [and Check Bits] | | | | | | | | Check Bits |
|---|---|---|---|---|---|---|---|---|
| 0123 4567 | 11 1111 8901 2345 | 1111 2222 6789 0123 | 2222 2233 4567 8901 | 3333 3333 2345 6789 | 4444 4444 0123 4567 | 4455 5555 8901 2345 | 5555 666 6789 0123 | cccc cccc 0123 4567 |
| 1111 0000 | 1000 1100 | 1111 0000 | 1111 1000 | 0100 1000 | 1000 1000 | 0000 1000 | 1111 1000 | 1000 0000 |
| 1111 0000 | 0100 1000 | 0000 1111 | 0000 0100 | 1100 0100 | 0100 0100 | 1111 0100 | 1111 0100 | 0100 0000 |
| 0000 1111 | 0010 1100 | 1111 0000 | 0000 0010 | 1000 0010 | 0010 0010 | 1111 0010 | 1111 0010 | 0010 0000 |
| 0000 1111 | 0001 0100 | 0000 1111 | 1111 0001 | 1100 0001 | 0001 0001 | 0000 0001 | 1111 0001 | 0001 0000 |
| 1000 1000 | 0000 0011 | 1000 1000 | 1000 1111 | 0001 1111 | 0000 1111 | 1000 0000 | 1000 1111 | 0000 1000 |
| 0100 0100 | 1111 0010 | 0100 0100 | 0100 0000 | 0011 0000 | 1111 1111 | 0100 0000 | 0100 1111 | 0000 0100 |
| 0010 0010 | 1111 0011 | 0010 0010 | 0010 1111 | 0010 0000 | 0000 0000 | 0010 1111 | 0010 1111 | 0000 0010 |
| 0001 0001 | 0000 0001 | 0001 0001 | 0001 0000 | 0011 1111 | 1111 0000 | 0001 1111 | 0001 1111 | 0000 0001 |

9. The method of claim 8, wherein said step of detecting and correcting is performed using the syndrome table:

| | | | | | | | |
|---|---|---|---|---|---|---|---|
| 00 No Error | 20 CB5 | 40 CB6 | 60 MBE | 80 CB7 | A0 MBE | C0 MBE | E0 DB34* |
| 01 CBO | 21 MBE | 41 MBE | 61 DB08 | 81 MBE | A1 DB40 | C1 DB52 | E1 MBE |
| 02 CB1 | 22 MBE | 42 MBE | 62 DB09 | 82 MBE | A2 DB41 | C2 DB53 | E2 MBE |
| 03 MBE | 23 DB01 | 43 DB02 | 63 MBE | 83 DB03 | A3 MBE | C3 MBE | E3 MBE |
| 04 CB2 | 24 MBE | 44 MBE | 64 DB10 | 84 MBE | A4 DB42 | C4 DB54 | E4 MBE |
| 05 MBE | 25 DB17 | 45 DB15 | 65 MBE | 85 DB19 | A5 MBE | C5 MBE | E5 MBE |
| 06 MBE | 26 DB49 | 46 DB50 | 66 MBE | 86 DB51 | A6 MBE | C6 MBE | E6 MBE |
| 07 DB12* | 27 MBE | 47 MBE | 67 MBE | 87 MBE | A7 MBE | C7 MBE | E7 MBE |
| 08 CB03 | 28 MBE | 48 MBE | 68 DB11 | 88 MBE | A8 DB43 | C8 DB55 | E8 MBE |
| 09 MBE | 29 DB25 | 49 DB26 | 69 MBE | 89 DB27 | A9 MBE | C9 MBE | E9 MBE |
| 0A MBE | 2A DB21 | 4A DB22 | 6A MBE | 8A DB23 | AA MBE | CA MBE | EA MBE |
| 0B DB33* | 2B MBE | 4B MBE | 6B MBE | 8B MBE | AB MBE | CB MBE | EB MBE |
| 0C MBE | 2C DB05 | 4C DB06 | 6C MBE | 8C DB07 | AC MBE | CC MBE | EC MBE |
| 0D DB13* | 2D MBE | 4D MBE | 6D MBE | 8D MBE | AD MBE | CD MBE | ED MBE |
| 0E DB32* | 2E MBE | 4E MBE | 6E MBE | 8E MBE | AE MBE | CE MBE | EE MBE |
| 0F MBE | 2F DB57 | 4F DB58 | 6F MBE | 8F DB59 | AF MBE | CF MBE | EF |
| 10 CB4 | 30 MBE | 50 MBE | 70 DB14* | 90 MBE | B0 DB35* | D0 DB15* | F0 MBE |
| 11 MBE | 31 DB44 | 51 DB28 | 71 MBE | 91 DB36 | B1 MBE | D1 MBE | F1 DB60 |
| 12 MBE | 32 DB45 | 52 DB29 | 72 MBE | 92 DB37 | B2 MBE | D2 MBE | F2 DB61 |
| 13 DBOO | 33 MBE | 53 MBE | 73 MBE | 93 MBE | B3 MBE | D3 MBE | F3 MBE |
| 14 MBE | 34 DB46 | 54 DB30 | 74 MBE | 94 DB38 | B4 MBE | D4 MBE | F4 DB62 |
| 15 DB16 | 35 MBE | 55 MBE | 75 MBE | 95 MBE | B5 MBE | D5 MBE | F5 MBE |
| 16 DB48 | 36 MBE | 56 MBE | 76 MBE | 96 MBE | B6 MBE | D6 MBE | F6 MBE |
| 17 MBE | 37 MBE | 57 MBE | 77 MBE | 97 MBE | B7 MBE | D7 MBE | F7 |
| 18 MBE | 38 DB47 | 58 DB31 | 78 MBE | 98 DB39 | B8 MBE | D8 MBE | F8 DB63 |
| 19 DB24 | 39 MBE | 59 MBE | 79 MBE | 99 MBE | B9 MBE | D9 MBE | F9 MBE |
| 1A DB20 | 3A MBE | 5A MBE | 7A MBE | 9A MBE | BA MBE | DA MBE | FA MBE |

-continued

| | | | | | | | |
|---|---|---|---|---|---|---|---|
| 1B MBE | 3B MBE | 5B MBE | 7B MBE | 9B MBE | BB MBE | DB MBE | FB |
| 1C DB04 | 3C MBE | 5C MBE | 7C MBE | 9C MBE | BC MBE | DC MBE | FC MBE |
| 1D MBE | 3D MBE | 5D MBE | 7D MBE | 9D MBE | BD MBE | DD MBE | FD |
| 1E MBE | 3E MBE | 5E MBE | 7E MBE | 9E MBE | BE MBE | DE MBE | FE |
| IF DB56 | 3F MBE | 5F MBE | 7F | 9F MBE | BF | DF | FF MBE |

10. A method of detecting and correcting errors in a computer, comprising the steps of:
   beginning a write operation of N data bits to a memory at a location designated in part by A address bits;
   generating M check bits from said N data bits and said A address bits;
   writing said N data bits and said M check bits to said location;
   reading said N data bits and M check bits from said location;
   generating X syndrome bits from said N data bits, said M check bits, and said A address bits;
   using said X syndrome bits to detect any single bit error and any double bit error within said A address bits.

11. The method of claim 10, further comprising using said X syndrome bits to detect and correct any single bit error within said N data bits and said M check bits, and to detect any double bit error within said N data bits and said M check bits.

12. The method of claim 11, further comprising using said X syndrome bits to detect any four bit error within four adjacent bits of said N data bits.

13. The method of claims 12, further comprising the step of using said X syndrome bits to detect any four bit error within four adjacent bits of said M check bits.

14. The method of claim 11, further comprising the step of using said X syndrome bits to detect any three bit error within four adjacent bits of said N data bits.

15. The method of claim 14, further comprising the step of using said X syndrome bits to detect any three bit error within four adjacent bits of said M check bits.

16. The method of claim 11, wherein N=64, M=8, X=8, and A=25.

17. The method of claim 16, wherein said check bits and said syndrome bits are determined by the parity-check matrix:

| Address Bits | | | | |
|---|---|---|---|---|
| 0123 4567 | 11 1111<br>8901 2345 | 1111 2222<br>6789 0123 | 2222 2233<br>4567 8901 | |
| xxx1 1110 | 0001 1110 | 0111 0011 | 1011 xxxx | |
| xxx1 1111 | 1110 0000 | 0111 0111 | 1100 xxxx | |
| xxx1 1110 | 0001 1111 | 1000 1101 | 0111 xxxx | |
| xxx0 0001 | 1111 1111 | 1100 1010 | 1011 xxxx | |
| xxx1 1001 | 1101 1001 | 0111 1001 | 1110 xxxx | |
| xxx1 0101 | 1011 0101 | 1111 0100 | 0101 xxxx | |
| xxx0 1111 | 0110 1010 | 1010 1110 | 0101 xxxx | |
| xxx0 0010 | 1110 0111 | 1001 1111 | 1010 xxxx | |

| Data Bits [and Check Bits] | | | | | | | | | Data & Check Bits |
|---|---|---|---|---|---|---|---|---|---|
| 0123 4567 | 11 1111<br>8901 2345 | 1111 2222<br>6789 0123 | 2222 2233<br>4567 8901 | 3333 3333<br>2345 6789 | 4444 4444<br>0123 4567 | 4455 5555<br>8901 2345 | 55cc 55cc<br>6707 8916 | | 66cc 66cc<br>0125 2334 |
| 1111 0000 | 1000 1100 | 1111 0000 | 1111 1000 | 0100 1000 | 1000 1000 | 0000 1000 | 1010 1000 | | 1000 1100 |
| 1111 0000 | 0100 1000 | 0000 1111 | 0000 0100 | 1100 0100 | 0100 0100 | 1111 0100 | 1100 1010 | | 1000 1000 |
| 0000 1111 | 0010 1100 | 1111 0000 | 0000 0010 | 1000 0010 | 0010 0010 | 1111 0010 | 1000 11c0 | | 1010 1000 |
| 0000 1111 | 0001 0100 | 0000 1111 | 1111 0001 | 1100 0001 | 0001 0001 | 0000 0001 | 1000 1000 | | 1100 1010 |
| 1000 1000 | 0000 0011 | 1000 1000 | 1000 1111 | 0001 1111 | 0000 1111 | 1006 0000 | 1100 0100 | | 0100 0101 |
| 0100 0100 | 1111 0010 | 0100 0100 | 0100 0000 | 0011 0000 | 1111 1111 | 0100 0000 | 0100 0100 | | 0101 1100 |
| 0010 0010 | 1111 0011 | 0010 0010 | 0010 1111 | 0010 0000 | 0000 0000 | 0010 1111 | 0100 0101 | | 1100 0100 |
| 0001 0001 | 0000 0001 | 0001 0001 | 0001 0000 | 0011 1111 | 1111 0000 | 0001 1111 | 0101 1100 | | 0100 0100 |

18. The method of claim 17, wherein said step of detecting and correcting is performed using the syndrome table:

| | | | | | | | |
|---|---|---|---|---|---|---|---|
| 00 No Error | 20 CB5 | 40 CB6 | 60 UNCER | 80 CB7 | A0 UNCER | C0 UNCER | E0 DB34 |
| 01 CB0 | 21 UNCER | 41 UNCER | 61 DB08 | 81 UNCER | A1 DB40 | C1 DB52 | E1 UNCER |
| 02 CB1 | 22 UNCER | 42 UNCER | 62 DB09 | 82 UNCER | A2 DB41 | C2 DB53 | E2 UNCER |
| 03 UNCER | 23 DB01 | 43 DB02 | 63 DB00 | 83 DB03 | A3 UNCER | C3 UNCER | E3 UNCER |
| 04 CB2 | 24 UNCER | 44 UNCER | 64 DB10 | 84 UNCER | A4 DB42 | C4 DB54 | E4 UNCER |
| 05 UNCER | 25 DB17 | 45 DB18 | 65 UNCER | 85 DB19 | A5 UNCER | C5 UNCER | E5 UNCER |
| 06 UNCER | 26 DB49 | 46 DB50 | 66 UNCER | 86 DB51 | A6 UNCER | C6 UNCER | E6 UNCER |
| 07 DB12 | 27 UNCER | 47 UNCER | 67 UNCER | 87 UNCER | A7 UNCER | C7 UNCER | E7 UNCER |
| 08 CB03 | 28 UNCER | 48 UNCER | 68 DB11 | 88 UNCER | A8 DB43 | C8 DB55 | E8 UNCER |
| 09 UNCER | 29 DB25 | 49 DB26 | 69 UNCER | 89 DB27 | A9 UNCER | C9 UNCER | E9 UNCER |

-continued

| | | | | | | | |
|---|---|---|---|---|---|---|---|
| 0A UNCER | 2A DB21 | 4A DB22 | 6A UNCER | 8A DB23 | AA UNCER | CA UNCER | EA UNCER |
| 0B DB33 | 2B UNCER | 4B UNCER | 6B UNCER | 8B UNCER | AB UNCER | CB UNCER | EB UNCER |
| 0C UNCER | 2C DB05 | 4C DB06 | 6C UNCER | 8C DB07 | AC UNCER | CC UNCER | EC UNCER |
| 0D DB13 | 2D UNCER | 4D UNCER | 6D UNCER | 8D UNCER | AD UNCER | CD UNCER | ED UNCER |
| 0E DB32 | 2E UNCER | 4E UNCER | 6E UNCER | 8E UNCER | AE UNCER | CE UNCER | EE UNCER |
| 0F UNCER | 2F DB62 | 4F DB60 | 6F UNCER | 8F DB58 | AF UNCER | CF UNCER | EF |
| 10 CB4 | 30 UNCER | 50 UNCER | 70 DB14 | 90 UNCER | B0 DB35 | D0 DB15 | F0 UNCER |
| 11 UNCER | 31 DB44 | 51 DB28 | 71 UNCER | 91 DB36 | B1 UNCER | D1 UNCER | F1 DB63 |
| 12 UNCER | 32 DB45 | 52 DB29 | 72 UNCER | 92 DB37 | B2 UNCER | D2 UNCER | F2 DB57 |
| 13 DB00 | 33 UNCER | 53 UNCER | 73 UNCER | 93 UNCER | B3 UNCER | D3 UNCER | F3 UNCER |
| 14 UNCER | 34 DB46 | 54 DB30 | 74 UNCER | 94 DB38 | B4 UNCER | D4 UNCER | F4 DB59 |
| 15 DB16 | 35 UNCER | 55 UNCER | 75 UNCER | 95 UNCER | B5 UNCER | D5 UNCER | F5 UNCER |
| 16 DB48 | 36 UNCER | 56 UNCER | 76 UNCER | 96 UNCER | B6 UNCER | D6 UNCER | F6 UNCER |
| 17 UNCER | 37 UNCER | 57 UNCER | 77 UNCER | 97 UNCER | B7 UNCER | D7 UNCER | F7 |
| 18 UNCER | 38 DB47 | 58 DB31 | 78 UNCER | 98 DB39 | B8 UNCER | D8 UNCER | F8 DB61 |
| 19 DB24 | 39 UNCER | 59 UNCER | 79 UNCER | 99 UNCER | B9 UNCER | D9 UNCER | F9 UNCER |
| 1A DB20 | 3A UNCER | 5A UNCER | 7A UNCER | 9A UNCER | BA UNCER | DA UNCER | FA UNCER |
| 1B UNCER | 3B UNCER | 5B UNCER | 7B UNCER | 9B UNCER | BB UNCER | DB UNCER | FB |
| 1C DB04 | 3C UNCER | 5C UNCER | 7C UNCER | 9C UNCER | BC UNCER | DC UNCER | FC UNCER |
| 1D UNCER | 3D UNCER | 5D UNCER | 7D UNCER | 9D UNCER | BD UNCER | DD UNCER | FD |
| 1E UNCER | 3E UNCER | 5E UNCER | 7E UNCER | 9E UNCER | BE UNCER | DE UNCER | FE |
| 1F DB56 | 3F UNCER | 5F UNCER | 7F | 9F UNCER | BF | DF | FF UNCER |

19. Error detecting and correcting apparatus for a computer having a CPU and a memory, comprising:

means for generating M check bits from N data bits upon initiation of a write operation of said N bits from the CPU to the memory;

means for writing said N data bits and said M check bits to the memory;

means for generating X syndrome bits from said N data bits and said M check bits upon initiation of a read operation of said N bits and said M check bits from the memory;

means for using said X syndrome bits to detect and correct any single bit error within said N data bits and said M check bits, to detect any double bit error within said N data bits and said M check bits, and to detect any four bit error within four adjacent bits of said N data bits.

20. The apparatus of claim 19, wherein said means for using said X syndrome bits detects any four bit error within four adjacent bits of said M check bits.

21. The apparatus of claim 19, wherein said means for using said X syndrome bits detects any three bit error within four adjacent bits of said N data bits.

22. The apparatus of claim 21, wherein said means for using said X syndrome bits detects any three bit error within four adjacent bits of said M check bits.

23. Error detecting and correcting apparatus for a computer having a CPU and a memory, comprising:

means for generating M check bits from N data bits and A address bits upon initiation of a write operation from the CPU to a location in the memory designated in Part by said A address bits;

means for writing said N data bits and said M check bits to said location in memory;

means for writing said N data bits and said M check bits to said location in memory;

means for generating X syndrome bits from said N data bits, said M check bits, and said A address bits upon initiation of a read operation from said location in the memory;

means for using said X syndrome bits to detect any single bit error and any double bit error within said A address bits.

24. The apparatus of claim 23, wherein said means for using said X syndrome bits detects and corrects any single bit error within said N data bits and said M check bits, and detects any double bit error within said N data bits and said M check bits.

25. The apparatus of claim 23, wherein said means for using said X syndrome bits detects any four bit error within four adjacent bits of said N data bits.

26. The apparatus of claim 25, wherein said means for using said X syndrome bits detects any four bit error within four adjacent bits of said M check bits.

27. The apparatus of claim 23, wherein said means for using said X syndrome bits detects any three bit error within four adjacent bits of said N data bits.

28. The apparatus of claim 27, wherein said means for using said X syndrome bits detects any three bit error within four adjacent bits of said M check bits.

29. Error detecting and correcting apparatus for a computer having a CPU and a memory, comprising:

means for generating M check bits from N data bits upon initiation of a write operation of said N bits from the CPU to the memory;

means for writing said N data bits and said M check bits to the memory;

means for generating X syndrome bits from said N data bits and said M check bits upon initiation of a read operation of said N bits and said M check bits from the memory;

means for using said X syndrome bits to detect errors within said N data bits;

wherein said means for generating said M check bits and said means for generating said X syndrome bits comprise:

a first ECC module and a second ECC module, said first ECC module generating one half of said M check bits and said X syndrome bits and said second ECC module generating the other half of said M check bits and said X syndrome bits; and means for communicating partially generated check bits and syndrome bits between said first and second ECC modules.

* * * * *